(12) United States Patent
Martinelli et al.

(10) Patent No.: US 6,947,618 B2
(45) Date of Patent: Sep. 20, 2005

(54) POLARIZATION CONTROLLER (75) Inventors: Massimo Martinelli, Santa Clara, CA (US); Russell Chipman, Tuscon, AZ (US)

(73) Assignee: JDS Uniphase Corporation, San Jose, CA (US)

(*) Notice: Subject to any disclaimer, the term of this patent is extended or adjusted under 35 U.S.C. 154(b) by 126 days.

(21) Appl. No.: 10/701,675

(22) Filed: Nov. 5, 2003

(65) Prior Publication Data

US 2004/0228567 A1 Nov. 18, 2004

Related U.S. Application Data

(60) Provisional application No. 60/425,529, filed on Nov. 12, 2002.

(51) Int. Cl.[7] .......................... G02B 6/00; G02B 27/28; G02B 5/30; G02F 1/03; G02F 1/29
(52) U.S. Cl. .................. 385/11; 359/250; 359/316; 359/483; 359/484; 359/494; 359/497
(58) Field of Search ................ 385/11, 14, 15, 385/31; 359/484, 494, 237, 250, 281, 316

(56) References Cited

U.S. PATENT DOCUMENTS

| | | | |
|---|---|---|---|
| 5,212,743 A | | 5/1993 | Heismann ............... 385/11 |
| 5,473,465 A | * | 12/1995 | Ye ............................ 359/246 |
| 6,552,836 B2 | * | 4/2003 | Miller ....................... 359/237 |
| 6,654,105 B2 | * | 11/2003 | Wang et al. ............. 356/73.1 |
| 6,856,710 B2 | * | 2/2005 | Wein et al. ................ 385/11 |

OTHER PUBLICATIONS

Imai et al, "Optical polarisation control utilizing an optical heterodyne detection scheme" Electron. Lett., vol. 21, pp. 52–53, Jan. 1985.

Okashi, "Polarization–State Control Schemes for Heterodyne or Homodyne Optical Fiber Communications", J. Lightwave Technol., vol. 3, pp 1232–1237, Dec. 1985.

Noe et al, "Endless Polarization Control Systems for Coherent Optics", J. Lightwave Technol. vol. 6, pp 1199–1208, Jul. 1988.

Aarts et al, "New Endless Polarization Control Method Using Three fiber Squeezers", J. Lightwave Technol., vol. 7, pp 1033–1043, Jul. 1989.

Heismann, "Integrated–Optic Polarization Transformer for Reset–Free Endless Polarization Control", IEEE J. Quantum Electron, vol. 25, pp 1898–1906, Aug. 1989.

Walker et al,"Polarization Control for Coherent Communications", J. Lightwave Technol. vol. 8, p. 438–458. Mar. 1990.

Rumbaugh et al, "Polarization Control for Coherent Fiber–Optic Systems Using Nematic Liquid Crystals", J. Lightwave Technol. vol. 8, pp 459–465, Mar. 1990.

Born et al "Principles of Optics", 6th ed. Cambridge U.K., University Press 1980, pp 23–36, 1980.

Kliger et al, "Polarized Light in Optics and Spectroscopy", San Diego, CA, Academic Press, 1997, pp. 103–152.

Heismann, "Analysis of a Reset–Free Polarization Controller for Fast Automatic Polarization Stabilization in Fiber–optic Transmission Systems", J. Lightwave Technol. vol. 12, pp 690–699, Apr. 1994.

Goldstein, "Classical Mechanics", 2nd ed, Reading, MA, Addison–Wesley, 1980, pp. 148–158.

(Continued)

Primary Examiner—Brian Healy
Assistant Examiner—Charlie Peng
(74) Attorney, Agent, or Firm—Allen, Dyer, Doppelt, Milbrath & Gilchrist, P.A.

(57) ABSTRACT

Polarization controlling elements equivalent to quarter and half waveplates are constructed from sequences of variable retarder plates having fixed retardation axes. An endless polarization control algorithm is provided.

16 Claims, 9 Drawing Sheets

OTHER PUBLICATIONS

Hurwitz et al, "A New Calculus for the Treatment of Optical Systems: II, Proof of Three General Equivalence Theorems", Opt. Soc. Am., vol. 31, pp. 493–499, Jul. 1941.

Kulpers, Quaternions and Rotation Sequences, Princeton, NJ: Princeton University Press, 1999, pp. 45–75 and 103–139.

Drewes et al, "Characterizing Polariation Controllers with Mueller Matrix Polarimetry", in Proc. SPIE, vol. 4532, 2001, pp. 462–466.

Lu et al, "Interpretation of Mueller Matrices based on Polar Decomposition", J. Opt. Soc. Am A. vol. 13, pp. 1106–1113, May 1996.

* cited by examiner

POLARIZATION CONTROLLER

CROSS-REFERENCE TO RELATED APPLICATIONS

This application claim priority of U.S. Provisional Patent Application No. 60/425,529 filed Nov. 12, 2002, entitled "Endless Polarization Control Algorithm Using Adjustable Linear Retarders With Fixed Axes" which is incorporated herein by reference for all purposes.

TECHNICAL FIELD

The present invention relates to polarization controllers and, in particular, to polarization controllers based on variable retardance retarders.

BACKGROUND OF THE INVENTION

The telecommunications industry has been working with polarization adjusters, controllers, and scramblers for many years. Typical uses include: optimizing optical power transmission through polarization dependent components; detecting polarization dependence of a component (by monitoring optical power at the output of the component while methodically scanning all the polarization states at the input of the component); and curtailing polarization dependence of components and detectors (by scanning substantially all possible states of polarization and illuminating components and detectors at a rate faster than the signal sampling rate). Polarization controllers having endless control capabilities, which allow for reset free operation, are also in use in polarization mode dispersion compensators. Heismann teaches such an endless polarization controller in U.S. Pat. No. 5,212,743 issued May 18, 1993 incorporated herein by reference.

Controlling the state of Polarization (SOP) in optical fibers has long been an active research topic with many papers published in the last twenty years: T. Imai, K. Nosu, and H Yamaguchi, "Optical polarisation control utilising an optical heterodyne detection scheme", Electron. Lett., vol. 21, pp. 52–53, January 1985; T. Okoshi, "Polarization-state control schemes for heterodyne or homodyne optical fiber communications", J. Lightwave Technol., vol. 3, pp. 1232–1237, December 1985; R. Noé, H. Heidrich, and D. Hoffmann, "Endless Polarization Control Systems for Coherent Optics", J. Lightwave Technol., vol. 6, pp. 1199–1208, July 1988; W. H. J. Aarts and G. D. Khoe, "New Endless Polarization Control Method Using Three Fiber Squeezers", J. Lightwave Technol., vol. 7, pp. 1033–1043, July 1989; F. Heismann, "Integrated-Optic Polarization Transformer for Reset-Free Endless Polarization Control", IEEE J. Quantum Electron., vol. 25, pp. 1898–1906, August 1989; N. G. Walker and G. R. Walker," Polarization Control for Coherent Communications", J. Lightwave Technol., vol. 8, pp. 438–458, March 1990; and S. H. Rumbaugh, M. D. Jones, and L. W. Casperson, "Polarization Control for Coherent Systems Using Nematic Liquid Crystals", J. Lightwave Technol., vol. 8, pp. 459–465, March 1990, all of which are incorporated herein by reference. Those articles dealt with devices for polarization control, e.g. fiber squeezers, liquid crystals, rotating waveplates, or waveguide devices including electro-optical materials such as $LiNbO_3$, and with algorithms for polarization control. The principal objective of these algorithms was to provide a polarization controller (PC) with unlimited transformation ranges. This property of being able to generate an arbitrary sequence of continuously varying polarization states is referred to as endlessness.

The transducers used as polarization control devices fall into two categories: variable retardation plates (VRP) and rotatable retarders. VRPs introduce an adjustable retardance between two orthogonal polarization components of the optic field; they are generally electrically adjustable retarders. Rotatable waveplates are linear retarders such as quarter wave plates (QWP) and half wave plates (HWP) mounted in rotary stages so their optical axis can be rotated. Devices based on $LiNbO_3$ waveguides can fall into either category with three or more electrodes required to rotate the axis of retardation. The main difference between these two classes of device is that VRPs have a finite retardance range and rotatable waveplates can be endlessly rotated. The retardance range of a VRP is limited by the voltage range of its power supply and the device physics. VRPs such as liquid crystal cells (LC) have a maximum and minimum retardance and electro-optical modulators have practical limits to the maximum voltage. In contrast the optical axis of a waveplate can be endlessly rotated and the orientation angle can be increased or decreased without bound.

PCs based on rotatable waveplates can provide endless polarization transformations. The VRP-based PCs are generally more complex with more elements and elaborate computer-controlled drive algorithms. The lack of suitable low-cost, low-insertion-loss PCs has slowed the development of optical modules for polarization mode dispersion compensation (PMDC). $LiNbO_3$-based PCs are quite expensive for such an application, whereas VRP-based PCs require driving algorithms that are complex for an efficient implementation. The cost and insertion loss of VRP-based PCs are more favourable than those related to LiNbO3-based PCs thereby providing motivation to explore VRP-based PC designs.

More specifically, VRPs are birefringent elements whose birefringence is varied by an externally applied voltage. The effect VRPs have on the SOP, represented as a point on the surface of a Poincaré sphere (M. Born and E. Wolf, *Principles of Optics*, 6th ed, Cambridge, U.K.: University Press, sixth edition, 1980, pp. 23–36, incorporated herein by reference), can be modeled by a rotation about an axis which is the fast axis of the element (D. S. Kliger, J. W. Lewis, and C. E. Randall, *Polarized Light in Optics and Spectroscopy*, San Diego, Calif.: Academic Press, 1997, pp. 103–152, incorporated herein by reference). For linearly birefringent VRPs the rotation axis lies on the equator of the sphere and the rotation angle equals the retardance of the device.

SUMMARY OF THE INVENTION

The invention provides VRP-based PCs that do not require any unwinding. In particular a one or more endlessly rotatable waveplates are provided by using a plurality of VRPs, without the need of resetting the voltages applied to the plates. Rotatable waveplates obtained from combinations of VRPs are provided in configurations for endless polarization control using an algorithm for rotatable waveplates, such as the algorithm contained in F. Heismann, "Analysis of a Reset-Free Polarization Controller for Fast Automatic Polarization Stabilization in Fiber-optic Transmission Systems", J. Lightwave Technol., vol. 12, pp. 690–699, April 1994, to provide an endless and reset-free polarization controller, incorporated herein by reference.

More specifically the present invention includes a polarization controlling system for controlling the state of polarization of a light beam comprising:

a waveplate having:
   a substantially constant retardance $\lambda$;

a variable rotation axis $$\hat{w} = \hat{x} \cos(\theta)\cos(\phi) + \hat{y} \sin(\theta)\cos(\phi) + \hat{z} \sin(\phi); \text{ and}$$

N variable retarders, N≥2, the retarders for being disposed sequentially along a propagation direction to receive the light beam, each variable retarder having a fast axis disposed at substantially 45° from the fast axis of each nearest variable retarder, each variable retarder having a variable retardance $r_x$, x having an odd or even value between 1 and N, each retarder having an odd value x having a rotation quaternion $X(r_x) = \{\cos(r_x/2), \sin(r_x/2)\hat{x}\}$, each retarder having an even value x having a component rotation quaternion $$Y(r_x) = \{\cos(r_x/2), \sin(r_x/2)\hat{y}\};$$

wherein a total rotation quaternion $$Q(X(r_1)Y(r_2)X(r_3)\ldots) = \ldots X(r_3)*Y(r_2)*X(r_1); \text{ and}$$

controlling means for controlling the retardances $r_x$ in dependence upon at least one solution to $$Q(X(r_1)Y(r_2)X(r_3)\ldots) = \ldots X(r_3)*Y(r_2)*X(r_1) = \{\cos(\lambda), \sin(\lambda)\hat{w}\}.$$

Furthermore, the present invention includes a polarization controlling system for controlling the state of polarization of a light beam comprising:

a waveplate having:

a substantially constant retardance λ;

a variable rotation axis $\hat{w}' = \hat{x} \cos(\theta) + \hat{y} \sin(\theta)$;

a first variable retarder having a first fast axis and a variable retardance u;

a second variable retarder having a second fast axis oriented at an angle of substantially 45° from the first fast axis and a variable retardance v;

a third variable retarder having a third fast axis oriented at an angle of substantially 0° from the first fast axis and a variable retardance w; and controlling means for controlling the retardances u, v and w whereby $$v = 2\text{sign}(\sin(\theta))\arccos\left\{\frac{\cos(\mu)}{\cos[\arctan(\cos(\theta)\tan(\mu))]}\right\}$$

wherein
sign(x) = −1 when x<0;
sign(x) = 0 when x=0;
sign(x) = 1 when x>0; and
0<2μ<π;

wherein the first, second and third variable retarders are disposed for modifying the state of polarization of the light beam for controlling the state of polarization of the light beam.

Moreover, the present invention includes a polarization controlling system for controlling the state of polarization of a light beam comprising:

a half waveplate having:

a retardance of substantially 180°;

a variable rotation axis $$\hat{w} = \hat{x} \cos(\theta) + \hat{y} \sin(\theta);$$

a first variable retarder having a first fast axis and a variable retardance $u_1$;

a second variable retarder having a second fast axis oriented at an angle of substantially 45° from the first fast axis and a variable retardance $U_2$;

a third variable retarder having a third fast axis oriented at an angle of substantially 0° from the first fast axis and a variable retardance $U_3$; and a fourth variable retarder having a fourth fast axis oriented at an angle of substantially 45° from the first fast axis and a variable retardance $U_4$; and controlling means for controlling the retardances $u_1$, $u_2$, $u_3$ and $u_4$ whereby $$u_1 = 2\,\text{sign}(\sin(\theta))\arccos[\cos(\lambda)\sqrt{1+(\tan(\lambda)\cos(\theta)\cos(\phi))^2}];$$

$$u_2 = 2\arctan(\tan(\lambda)\cos(\theta)\cos(\phi)) + \arctan[\cos(\theta+\Delta\theta)\tan(\mu)];$$

$$u_3 = 2\text{sign}(\sin(\theta+\Delta\theta)) \times \arccos\left\{\frac{\cos(\mu)}{\cos[\arctan[\cos(\theta+\Delta\theta)\tan(\mu)]]}\right\};$$

$$u_4 = \arctan[\cos(\theta+\Delta\theta)\tan(\mu)];$$

wherein:

$$\phi = -\arcsin\left[\frac{-1+\sqrt{1+[\tan\lambda\sin(2\theta)]^2}}{\tan\lambda\sin(2\theta)}\right]$$

$$\Delta\theta = -\arctan(\sin(\phi)\tan(\lambda));$$

$$\mu = \arctan\left[\sqrt{\frac{1}{\sin^2(\lambda)\cos^2(\phi)}-1}\right]; \text{ and}$$

0<λ<π/2;

wherein the first, second, third and fourth variable retarders are disposed for modifying the state of polarization of the light beam for controlling the state of polarization of the light beam.

BRIEF DESCRIPTION OF THE DRAWINGS

Exemplary embodiments of the invention will now be described in conjunction with the drawings in which.

DETAILED DESCRIPTION OF THE INVENTION

In accordance with an embodiment of the invention VRP-based PCs described consist of a sequence of at least three VRPs having their fast axes oriented alternately at 0° and 45° with respect to the horizontal. The effect of the VRPs on the SOP is to produce a sequence of rotations alternately about the x and y Cartesian axes of the Poincaré sphere space. The combined effect of these cascaded rotations is a resultant (total) rotation characterized by resultant rotation axis and angle both function of the rotation axis and rotation angle of the individual component rotations. Even though the rotation axes of the component rotations lie on the equator of the Poincaré sphere, because only variable linear retarders and not variable elliptical retarders are considered here, the net rotation axis is in general off the equator. Thus a sequence of VRPs typically behaves as an elliptical retarder. According to Euler's rotation theorem (H. Goldstein, *Classical Mechanics*, 2nd ed, Reading, Mass.: Addison-Wesley, 1980, pp. 148–158, incorporated herein by reference) a sequence of three VRPs, with fast axes at 45°, and 45°, can produce all possible rotations on the Poincaré sphere and transform any SOP into any other SOP. Such a configuration is referred to as complete. Since the retardance range of each VRP is limited, this configuration cannot be endless. Endlessness requires additional VRPs which are used to produce the same SOP transformation with different sets of values of the component rotations. When a VRP approaches its limit, the retardance of other plates are adjusted to keep the desired SOP while moving one plate's retardance away from its limit, a procedure called resetting or unwinding. The search for this set of equivalent rotations (obtained with distinct set of values of the component rotations) is in general complex and usually performed in a feedback loop. The approach to endless polarization control proposed in the past has always been based on unwinding, for example see R. Noé, H. Heidrich, and D. Hoffmann, "Endless Polarization Control Systems for Coherent Optics", J. Lightwave Technol., vol. 6, pp. 1199–1208, July 1988; W. H. J. Aarts and G. D. Khoe, "New Endless Polarization Control Method Using Three Fiber Squeezers", J. Lightwave Technol., vol. 7, pp. 1033–1043, July 1989; N. G. Walker and G. R. Walker," Polarization Control for Coherent Communications", J. Lightwave Technol., vol. 8, pp. 438–458, March 1990; and S. H. Rumbaugh, M. D. Jones, and L. W. Casperson, "Polarization Control for Coherent Systems Using Nematic Liquid Crystals", J. Lightwave Technol., vol. 8, pp. 459–465, March 1990 all of which are incorporated herein by reference. The present invention consists of constraining the component rotations to assume only a well-defined set of values (rotation profiles) which are able to produce all possible rotations in a continuous manner. Since these retardance values fall within the range of the component devices, an endless and reset-free control algorithm can be achieved.

This invention provides a quaternion-based approach to sequences of retarders. Following a brief quaternion review, rotations produced by a sequence of two, three and four VRPs seeking solutions with constant retardance and a retardance axis for being endlessly varied are provided. VRP sequences for endlessly rotatable QWPs and HWPs are derived. QWPs and HWPs are the basic components of a well understood endless reset-free polarization control scheme analyzed in F. Heismann, "Analysis of a Reset-Free Polarization Controller for Fast Automatic Polarization Stabilization in Fiber-optic Transmission Systems", J. Lightwave Technol., vol. 12, pp. 690–699, Apr. 1994.

Rotations and Rotation Algebra Review

Figure 1:
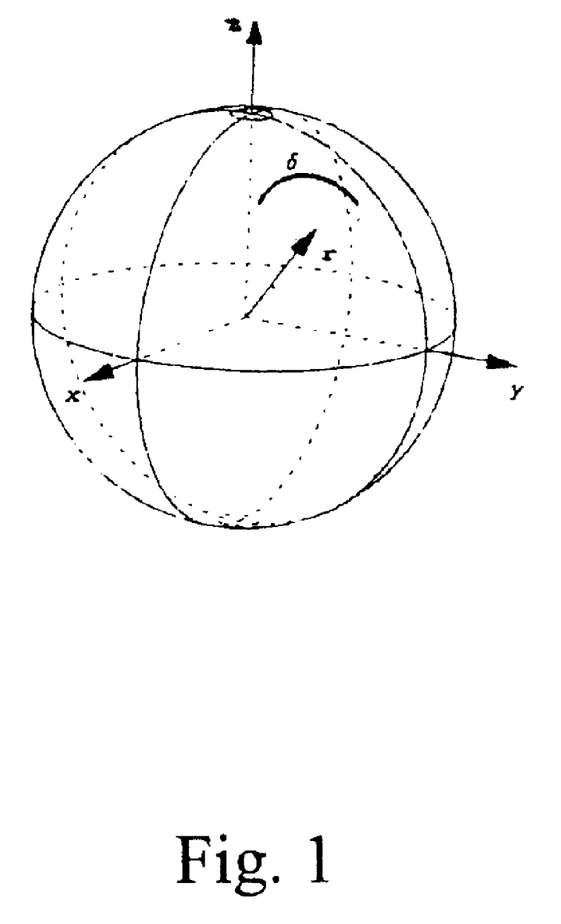
FIG. 1 is a schematic representation of a rotation imparted by the matrix T where δ is the rotation angle and r is the rotation axis.

Jones matrices for ideal retarders are unitary matrices, i.e. matrices which do not alter the norm of a vector. This matrix operator can be thought of as a rotation of a spherical surface i.e. the Poincaré sphere. See for example: H. Hurwitz and R. C. Jones, "A New Calculus for the Treatment of Optical Systems: II. Proof of Three General Equivalence Theorems", J. Opt. Soc. Am., vol. 31, pp. 493–499, July 1941, incorporated herein by reference. Here, all the VRPs are treated as lossless devices without absorption or polarization dependent loss, an accurate assumption based on Mueller matrix measurements of LC devices. A general and convenient way to write the Jones matrix of a lossless device is in terms of the Euler parameters (H. Goldstein, *Classical Mechanics*, 2nd ed, Reading, Mass.: Addison-Wesley, 1980, pp. 148–158):

$$T = \begin{bmatrix} \cos(\delta/2) - i\sin(\delta/2)r_x & \sin(\delta/2)(-ir_y + r_z) \\ -\sin(\delta/2)(ir_y + r_z) & \cos(\delta/2) + i\sin(\delta/2)r_x \end{bmatrix} \quad (1)$$

This matrix represents a rotation through an angle δ about an axis identified by a unit vector $\hat{r}=(r_x, r_y, r_z)$, i.e. the device's fast axis, as shown in FIG. 1. In the notation adopted here, left-handed rotations are considered positive but both forms of the sign convention can be found in the literature (J. B. Kuipers, *Quaternions and Rotation Sequences*, Princeton, N.J.: Princeton University Press, 1999, pp. 45–75 and 103–139). Throughout this document, the terms "retardance" and "rotation angle" are used interchangeably, since the quantity δ in FIG. 1 can always be interpreted as the retardance introduced by the corresponding elliptical retarder between two elliptical Eigen-polarizations represented on the Poincaré sphere by the vectors $\hat{r}$ and $-\hat{r}$.

VRPs with fast axes at 0° and 45° with respect to the horizontal are represented by rotations about the x-axis and y-axis respectively. The rotations produced by a sequence of VRPs is obtained by multiplying together their Jones matrices and reducing the result to the form of equation (1). However, all the information concerning the rotation, i.e. its angle and axis, is contained in the first row of the matrix. Thus, a more compact notation for rotations is the unit quaternion (J. B. Kuipers, *Quaternions and Rotation Sequences*, Princeton, N.J.: Princeton University Press, 1999, pp. 45–75 and 103–139), which may be written as $$Q=\{Cos(\delta/2), Sin(\delta/2)\hat{r}\} \quad (2)$$

Using the quaternion Q, a rotation of a point $s=(s_x, s_y, s_z)$, represented by the quaternion {0,s}, is (see Appendix)

$$\{0,\vec{s}_{rotated}\}=Q^{-1}*\{0,\vec{s}\}*Q \quad (3)$$

where the symbol "*" represents quaternion multiplication (J. B. Kuipers, *Quaternions and Rotation Sequences*, Princeton, N.J.: Princeton University Press, 1999, pp. 45–75 and 103–139). Quaternions are convenient for expressing a sequence of rotations. For instance, the concatenation of Q1 followed by Q2 is $$Q=Q_1{}^*Q_2=\{c_1c_2-s_1s_2\hat{r}_1\cdot\hat{r}_2, c_1s_2\hat{r}_2+c_2s_1\hat{r}_1+s_1s_2\hat{r}\times\hat{r}_2\} \quad (4)$$

where $$c_{1,2}=\cos(\delta_{1,2}/2) \text{ and } s_{1,2}=\sin(\delta_{1,2}/2)$$

In the following, equation (4) is applied to compute analytical expressions of the rotations produced by a sequence of VRPs, starting from the case of two VRPs. In each case, solutions equivalent to a rotatable waveplate are sought. These solutions are characterized by a constant rotation angle and a rotation axis which can be endlessly varied.

Concatenating Two Rotations

The simplest case is that of the concatenation of two VRPs, the first with fast axis oriented at 45° and the second with fast axis oriented at 0°. On the Poincaré sphere this yields a sequence of two rotations, the first about the Cartesian y-axis followed by one about the Cartesian x-axis. It is to be noted that there is a factor of two on the Poincaré sphere between the longitude and the orientation of the major axis of polarization. One complete circuit around the equator of the Poincaré sphere yields a net rotation of 180° of major axis orientation. Thus a VRP with a 45° fast axis has a corresponding quaternion with a rotation about the Cartesian y-axis. In cascades of rotations single rotations are referred to as component rotations, vs. the total, or net, rotation produced by their concatenation. The component rotations about Y and X axes are represented respectively by the quaternions $$Y(v)=\{\cos(v/2), \sin(v/2)\hat{y}\}, X(u)=\{\cos(u/2), \sin(u/2)\hat{x}\} \quad (5)$$

where v and u are the rotation angles. Concatenating these rotations yields $$Q_{YX} = Y(v) * X(u) \quad (6)$$
$$= \{\cos(v/2)\cos(u/2), \cos(v/2)\sin(u/2)\hat{x} + \sin(v/2)[\cos(u/2)\hat{y} - \sin(u/2)\hat{z}]\}$$

In equation (6), the scalar part of the quaternion is the cosine of half the rotation angle. A sequence of two VRPs equivalent to a rotatable waveplate would have a constant rotation angle (retardance) and a rotation axis which makes a circuit around the equator of the Poincaré sphere. Solutions with a constant rotation angle are sought by setting $$\cos(v/2)\cos(u/2)=\cos(\lambda) \quad (7)$$

with 2λ being a constant giving the net rotation angle. This yields $$Q_{YX}=\{\cos(\lambda), \sin(\lambda)\hat{w}\} \quad (8)$$

with $$w_x = \frac{\tan(u/2)}{\tan(\lambda)} \quad (9)$$

$$w_y = \frac{\sin(v/2)\cos(u/2)}{\sin(\lambda)}$$

$$w_z = -\frac{\sin(v/2)\sin(u/2)}{\sin(\lambda)}$$

Note that solutions exist only for $0< <\pi/2$. Equations (7) and (9) provide solutions in an implicit form. Since u and v are functions of the voltage applied to the VRPs, it is convenient to rewrite them in parametric form by equating (8) to $$Q_{YX}=\{\cos(\lambda), \sin(\lambda)(\cos(\theta)\cos(\phi)\hat{x}+\sin(\theta)\cos(\phi)\hat{y}+\sin(\phi)\hat{z})\} \quad (10)$$

where θ and φ are the longitude and latitude angles of the rotation axis. Lengthy but straightforward trigonometry yields $$v=2\,\text{sign}(\sin(\theta))\arccos[\cos(\lambda)\sqrt{1+(\tan(\lambda)\cos(\theta)\cos(\phi))^2}],$$
$$u=2\arctan(\tan(\lambda)\cos(\theta)\cos(\phi)), \quad (11)$$

and $$\phi = -\arcsin\left[\frac{-1+\sqrt{1+[\tan(\lambda)\sin(2\theta)]^2}}{\tan(\lambda)\sin(2\theta)}\right] \quad (12)$$

with $$\text{sign}(x) = \begin{cases} -1 & \text{when } x < 0 \\ 0 & \text{when } x = 0 \\ 1 & \text{when } x > 0. \end{cases}$$

Figure 2A:
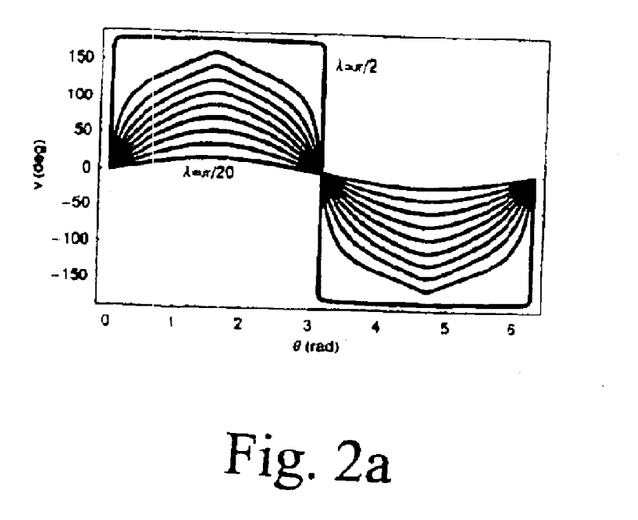
FIG. 2a represents the retardance profile for the component rotation about the y-axis for different values of λ.
Figure 2B:
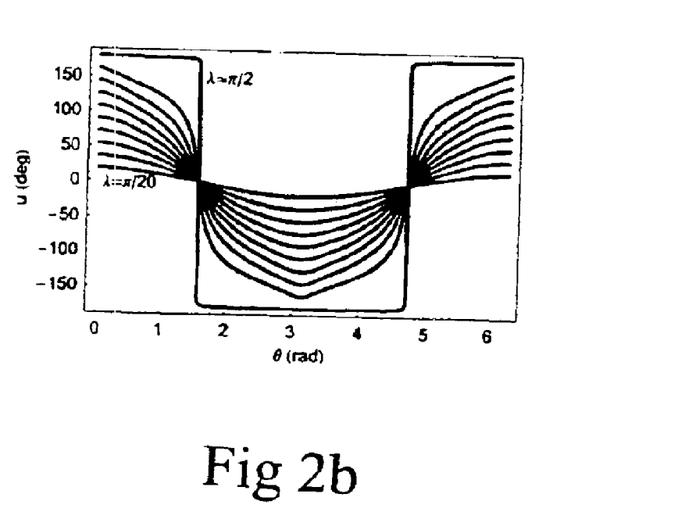
FIG. 2b represents the retardance profile for the component rotation about the x-axis for different values of λ.
Figure 3:
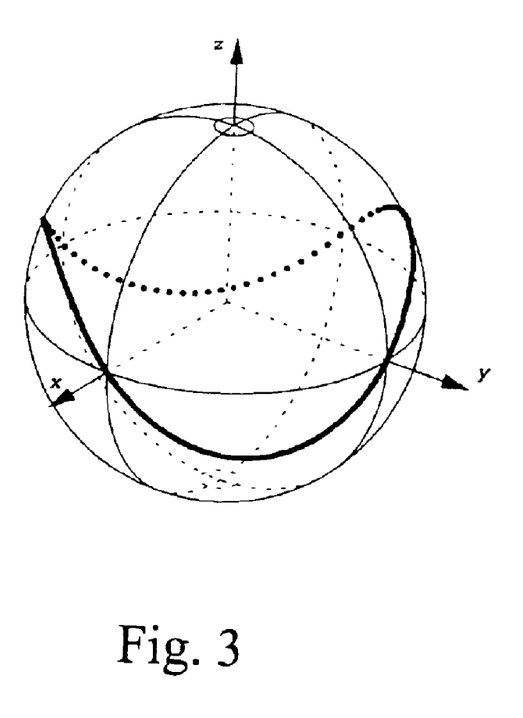
FIG. 3 represents the rotation axis trace for the endless solution based on two rotation for λ=π/4.

FIG. 2 shows the two component rotations for these constant retardance solutions as a function of λ. FIG. 3 shows how the position of rotation axis varies on the Poincaré sphere for the λ=π/4 solution. As the component rotations u and v are varied, the device is a linear retarder only for the four crossings of the equator of the Poincaré sphere corresponding to quarter wave plates oriented at 0°, 45°, 90° and 135°. The other parts of the trajectory correspond to elliptical quarter wave retarders. As θ varies from 0 to 2π, the axis performs one exact revolution around the sphere. Thus the rotation axis can endlessly move along that trajectory, without the need of resetting either v or u. These solutions are periodic functions of θ, with the ranges of u and v spanning less than 360°. A true rotatable quarter wave plate is not possible with two VRPs. This adjustable quarter wave elliptical retarder is easily implementable with two LCs or two electro-optical modulators which individually adjust linear retardance magnitude. The retardance profiles in (11) assume positive and negative values. Some devices such as LCs do not readily adjust to positive and negative values. Similarly electro-optical devices based on the quadratic electro-optical effect are one-sided. Since equations (7) and (9) are periodic functions of u and v, these solutions can be rewritten so that u and v assume only positive values. These solutions are obtained from the sequence Y*X, however, the same class of solutions can be obtained from X*Y.

It has thus been shown that a sequence of two VRPs can provide endless rotations, however the resulting device is not an ordinary linear waveplate, but rather an elliptically retarding element which does not move on a great circle on the Poincaré sphere.

Concatenating Three Rotations

A description for obtaining endlessly rotatable linear waveplates by cascading three VRPs follows hereafter. First the sequence with retardance axes oriented at 0°, 45° and 0° is treated. This sequence corresponds to three component rotations X(u) followed by Y(v) followed by X(w), i.e.

$$Q_{XYX} = X(u)*Y(v)*X(w). \quad (13)$$

Expanding the quaternion multiplication gives $$Q_{XYX} = \left\{ \cos\left(\frac{v}{2}\right)\cos\left(\frac{u+w}{2}\right), \right. \quad (14)$$
$$\left. \cos\left(\frac{v}{2}\right)\sin\left(\frac{u+w}{2}\right)\hat{x} + \sin\left(\frac{v}{2}\right)\left(\cos\left(\frac{u-w}{2}\right)\hat{y} + \sin\left(\frac{u-w}{2}\right)\hat{z}\right)\right\}.$$

Solutions are sought providing a constant rotation angle $2\mu$ with axis lying on the (x, y) plane. The additional degree of freedom provided by the third plate now provides solutions of the form $$Q_{XYX} = \{\cos(\mu), \sin(\mu)(\cos(\theta)\hat{x} + \sin(\theta)\hat{y})\}, \quad (15)$$

where again θ is the angle between the x-axis and the rotation axis. Comparing equations (14) and (15) yields the expressions for the component rotations u, v, and w:

$$u = w = \arctan(\cos(\theta)\tan(\mu)),$$

$$v = 2\text{sign}(\sin(\theta))\arccos\left\{\frac{\cos(\mu)}{\cos[\arctan(\cos(\theta)\tan(\mu))]}\right\}. \quad (16)$$

Figure 4A:
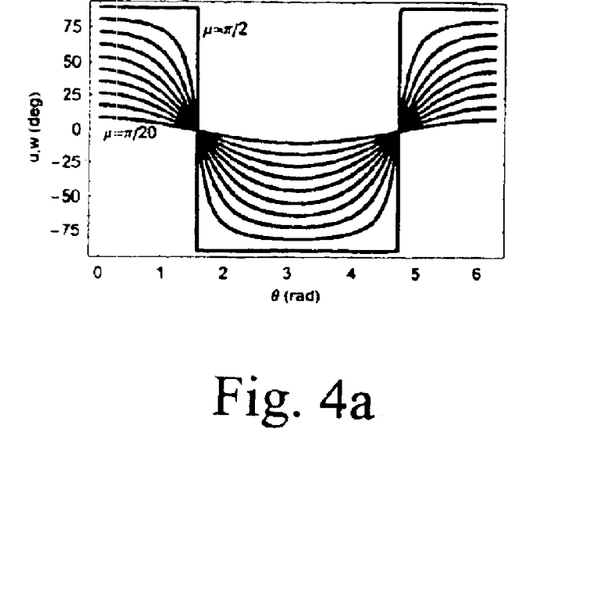
FIG. 4a represents the retardance profile for the component rotations about the x-axis for different values of the total rotation 2μ.
Figure 4B:
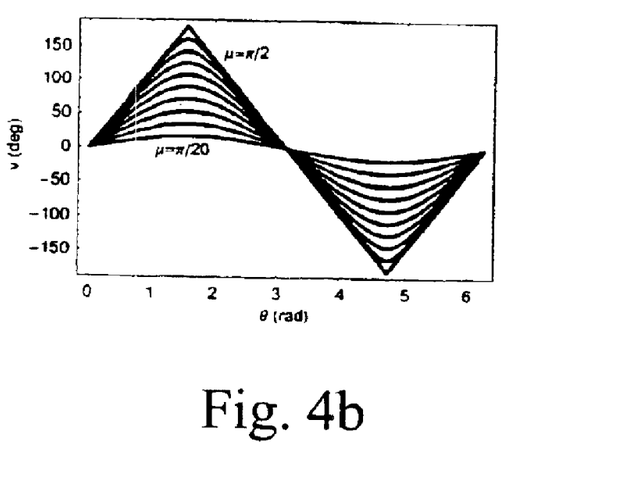
FIG. 4b represents the retardance profile for the component rotations about the y-axis for different values of the total rotation 2μ.
Figure 5A:
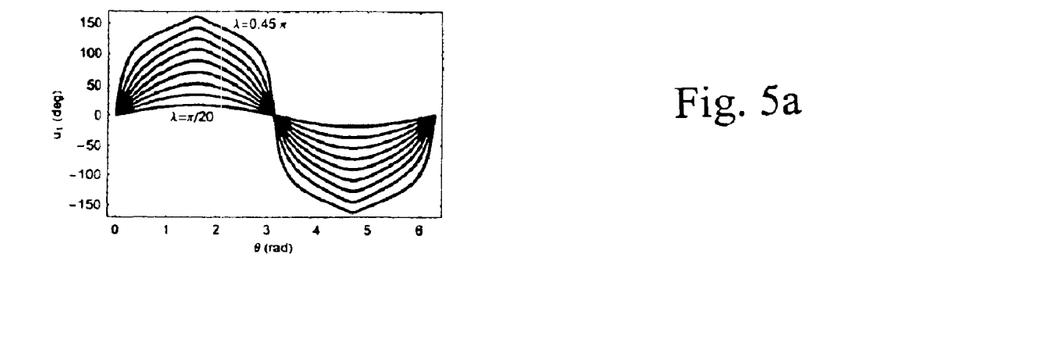
FIGS. 5a through 5d represent the retardance profile of $u_1$ through $u_4$ respectively, for different values of parameter λ.
Figure 5B:
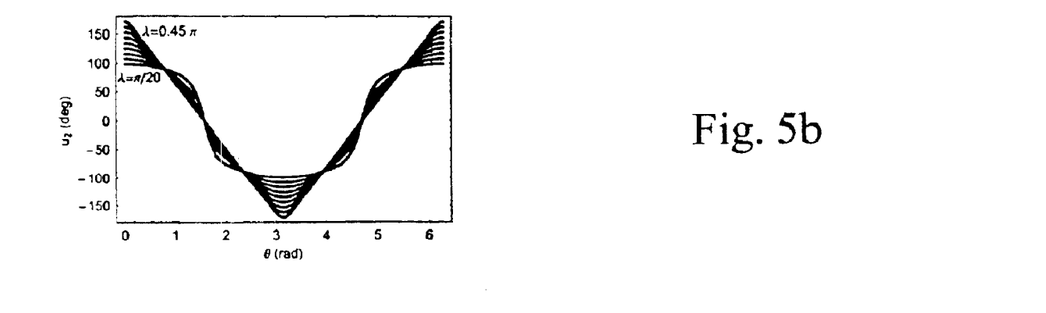
Figure 5C:
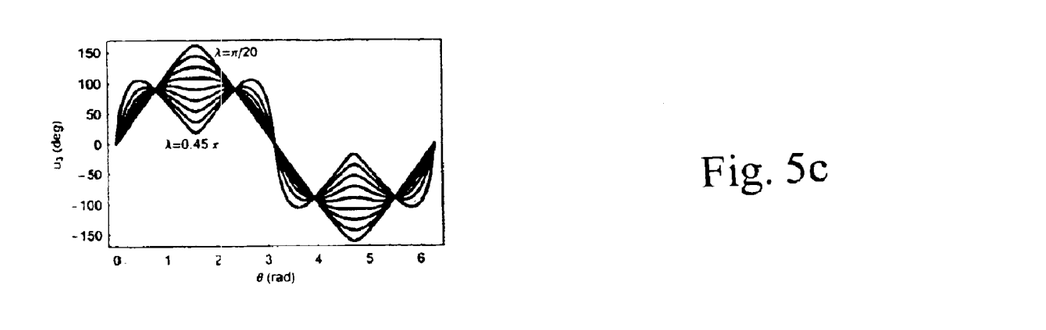
Figure 5D:
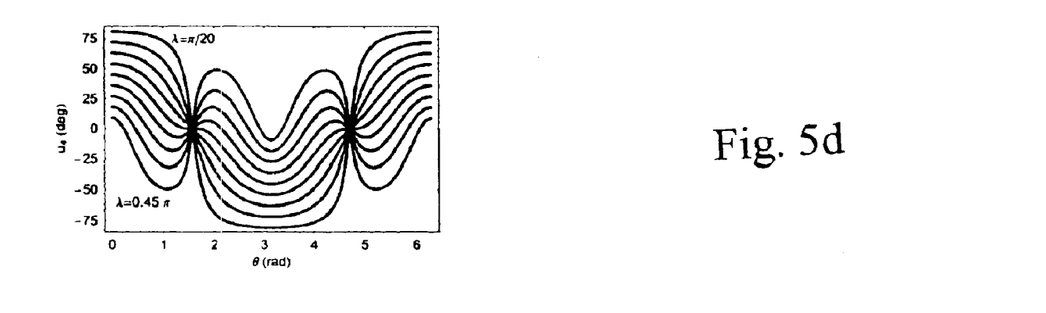

Solutions are found for $0 < \mu < \pi/2$ yielding endlessly rotatable linear waveplates with retardance selectable in the range $0 < 2\mu < \pi$ by cascading three VRPs. The component rotations functions are shown in FIGS. 4(a) and (b). It is to be noted that rotations u and w are equal. In this case also, the same type of solutions can be obtained using the sequence Y*X*Y and the rotation profiles in (16) can also be shifted in such a way that u, v, and w assume only positive values. The rotation profiles shown in FIG. 4 are smooth functions of θ as long as the net rotation does not approach π. At $2\mu = \pi$, i.e. at the retardance of a HWP, u and w become a non continuous function of θ making this solution unsuitable for an automatic polarization control application voltages to respond to small variations of a target SOP. Note that a HWP could be obtained by placing two QWPs in series, thus requiring 5 or 6 VRPs. Although feasible it would be a wasteful way of obtaining a rotatable HWP.

Concatenating Four Rotations

Using the notation of the previous sections, the solutions obtainable by concatenating four rotations are found by expanding the quaternion multiplication $$Q_{YXYX} = Y(u_1)*X(u_2)*Y(u_3)*X(u_4), \quad (17)$$

To search for endless solutions with constant rotation angle, it is possible to use the same technique as in the instances above. However, in the present instance, the number of independent equations is less than the number of variables. One way of obviating this problem would be to make a guess on one of the component rotations and solve numerically for the remaining ones. This numerical method is not described further as numerical methods of this sort are well known. Instead, an analytical solution is provided for an endless HWP. First, equation (17) is rewritten as $$Q_{YXYX} = Y(u_1) * X(u_2' + u_2'') * Y(u_3) * X(u_4)$$
$$= [Y(u_1) * X(u_2')] * [X(u_2'') * Y(u_3) * X(u_4)],$$

wherein $u_2 = u_2' + u_2''$. The two and three rotation solutions derived in sections B and C are used for the rotations inside the square brackets. $Q_{YXYX}$ is treated as the concatenation of an endless rotation, of angle $2\lambda$ and rotation axis of polar coordinates (θ, φ), with the endless rotation of angle $2\mu$ and axis of polar coordinates (θ+Δθ, 0), i.e.

$$Q_{YXYX} = \{\cos(\lambda), \sin(\lambda)(\cos(\theta)\cos(\phi)\hat{x} + \sin(\theta)\cos(\phi)\hat{y} + \sin(\phi)\hat{z})\} * \{\cos(\mu), \sin(\mu)(\cos(\theta+\Delta\theta)\hat{x} + \sin(\theta+\Delta\theta)\hat{y})\} \quad (18)$$

For a HWP, the rotation corresponds to an angle of π radians with the rotation axis lying in the (x, y) plane. Thus, the target quaternion is $$Q_{XYXY} = \{0, \cos(\theta)\hat{x} + \sin(\theta)\hat{y}\},$$

which, when set equal to (18), yields the expressions for μ and Δθ in terms of θ and λ:

$$\Delta\theta = -\arctan(\sin(\phi)\tan(\lambda)),$$

$$\mu = \arctan\left[\sqrt{\frac{1}{\sin^2(\lambda)\cos^2(\phi)} - 1}\right], \quad (19)$$

where φ is given by (12). Hence, the resulting expressions for four component rotations yielding a rotatable half wave plate are the following:

$$u_1 = 2\text{sign}(\sin(\theta))\arccos \quad (20)$$
$$\left[\cos(\lambda)\sqrt{1 + (\tan(\lambda)\cos(\theta)\cos(\phi))^2}\right],$$
$$u_2 = 2\arctan(\tan(\lambda)\cos(\theta)\cos(\phi)) +$$
$$\arctan[\cos(\theta+\Delta\theta)\tan(\mu)],$$
$$u_3 = 2\text{sign}(\sin(\theta+\Delta\theta)) \times$$
$$\arccos\left\{\frac{\cos(\mu)}{\cos[\arctan[\cos(\theta+\Delta\theta)\tan(\mu)]]}\right\},$$
$$u_4 = \arctan[\cos(\theta+\Delta\theta)\tan(\mu)].$$

These equations express the four component rotations as function of θ with a free parameter λ located in the interval $(0, \pi/2)$. These rotation profiles are plotted in FIG. 5(a)–(d).

Thus, as seen in section C, a rotatable HWP lies on the boundary three-plate solutions, the only solution being discontinuous. With four VRPs a family of solutions exists parameterized by λ.

Endless Polarization Control with VRPs

A reset-free endless polarization controller can be designed from VRPs using a well-known rotatable waveplates algorithm which is reset-free (F. Heismann, "Analysis of a Reset-Free Polarization Controller for Fast Automatic Polarization Stabilization in Fiber-optic Transmission Systems", J. Lightwave Technol., vol. 12, pp. 690–699, April 1994). This algorithm uses three rotatable waveplates: a QWP, a HWP, and another QWP. As an example, the special case where the fast axes the two QWPs are π/2 apart will be considered. Such a PC has two degrees of freedom: α and β which are the angles of the rotatable waveplates: QWP(α), HWP(β), and QWP(α+π/2) where the (α+π/2) occurs on the third plate. Such a configuration of retarders is always a half wave retarder with Eigen-polarizations on the Poincaré sphere at Cartesian longitude 2α and latitude 2(β−α). In the instance where an arbitrary polarization state s at Cartesian latitude φ and longitude θ (polarization ellipse major axis at θ/2) to be rotated to polarization state $s_{rotated}$ with $\phi_{rotated}$ and $\theta_{rotated}$ is considered. The two half wave retarder solutions which perform this transformation are located on the great circle through s and $s_{rotated}$ half way between the two states. Either of the half wave retarders rotates the great circle 180° back onto itself. Thus, the PC can transform between any two polarization states because it can generate any half wave retarder. Provided the specified input and output states move continuously, their midpoint will move continuously, and the PC can endlessly follow the states.

The three rotatable waveplate PC algorithm may be implemented with 8 VRPs by using the sequence YXY for the first QWP, YXYX for the HWP, XYX for the second QWP, and taking into account that consecutive rotations about the same axis can be implemented by one plate.

Experimental Verification

Figure 6:
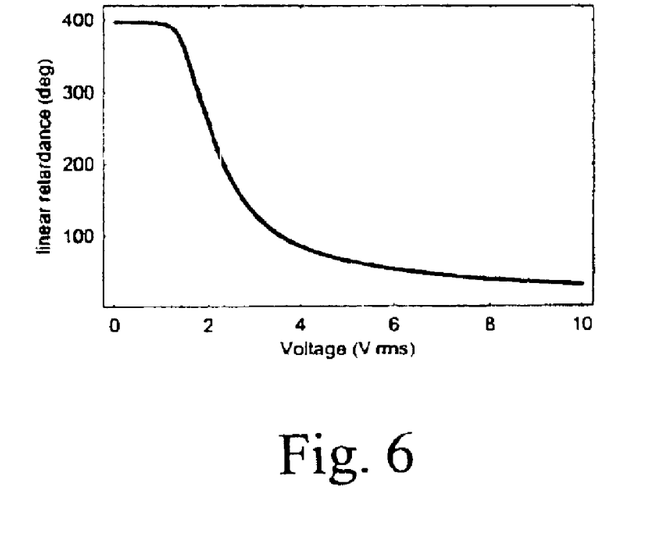
FIG. 6 shows a typical electro-optic response (linear retardance vs. voltage) of LC cells used in demonstrating the present invention.
Figure 7:
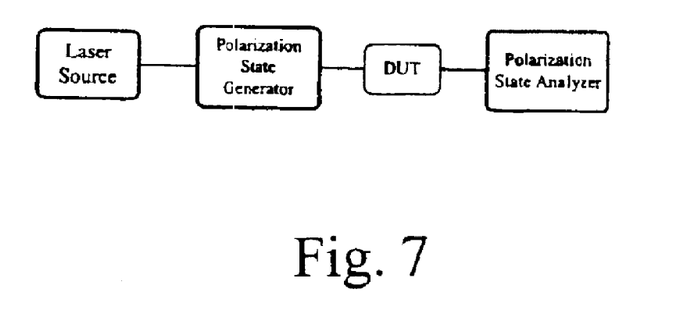
FIG. 7 shows a schematic of the experimental set-up for measuring the retardance of LC assemblies.
Figure 8A:
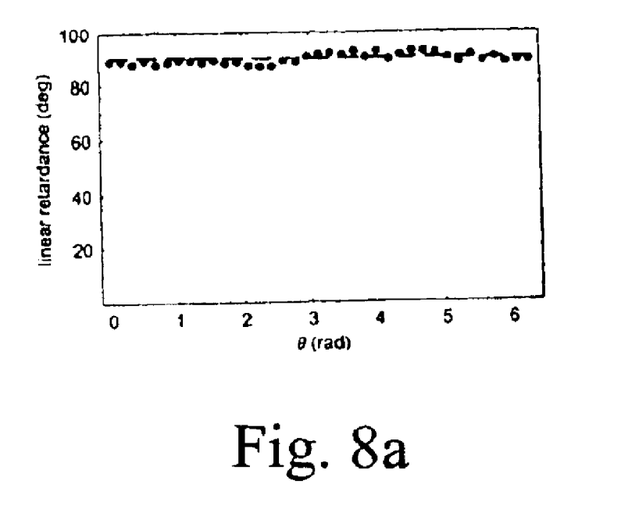
FIGS. 8(a) and (b) respectively show the measured retardance and azimuth angle for a rotatable QWP obtained as a sequence of three LCs.
Figure 8B:
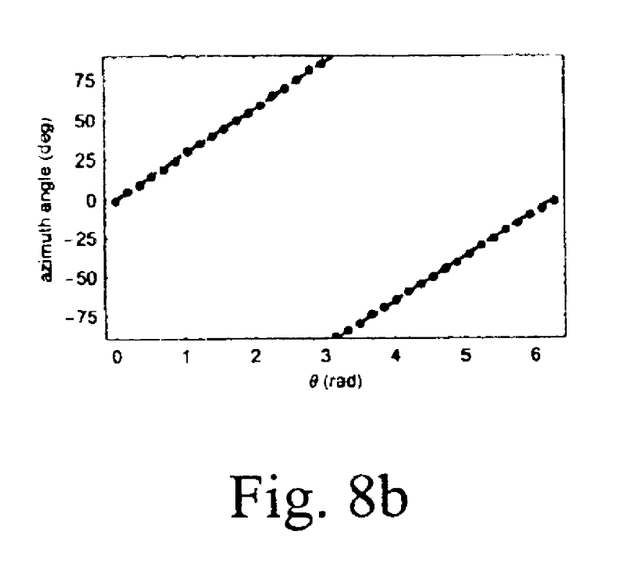

The experimental verification of the above-described endless PC design was performed using commercially available nematic liquid crystal cells (untwisted). The electro-optic (EO) response of each cell was measured using a Mueller Matrix Polarimeter (MMP) (J. E. Drewes, R. A. Chipman, M. H. Smith, "Characterizing polarization controllers with Mueller matrix polarimetry", in Proc. SPIE, vol. 4532, 2001, pp. 462–466). The typical EO response (linear retardance vs. voltage) of these LC cells is shown in FIG. 6. The positive/negative rotation angle profiles derived in the previous section are easily obtained by placing a waveplate, e.g. a quartz HWP, next to the LC cell to bias (offset) the retardance. The rotation profiles can be translated into voltage profiles by a look-up table. FIG. 7 shows a schematic of the experimental set-up for measuring the retardance of LCs assemblies. A rotating quarter wave linear retarder is demonstrated using a sequence of three LCs, with fast axes oriented at 45°, 0° and 45° respectively with the voltage profiles of section II-C. FIGS. 8(a) and (b) show the measured retardance and azimuth angle, obtained from the measured Mueller matrices (S. Y. Lu, R. A. Chipman, "Interpretation of Mueller matrices based on polar decomposition", J. Opt. Soc. Am. A, vol. 13, pp. 1106–1113, May 1996), vs. parameter θ. The value of the assembly net rotation was chosen to be $2\mu=\pi/2$. This value was obtained, see FIG. 8(a), with an error of less than 3.5%. The measurements also showed that the circular retardance was very small (the rotation axis moves very near the equator).

Figure 9A:
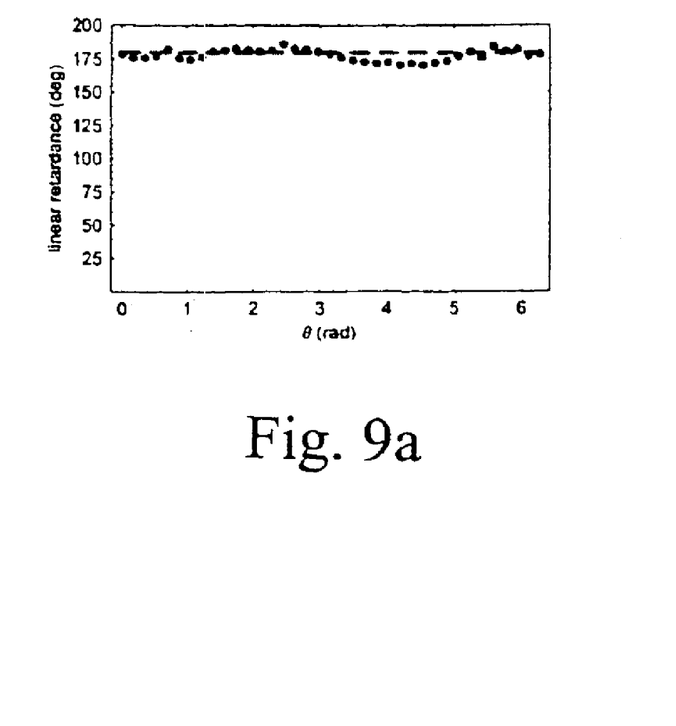
FIG. 9(a) shows that the desired half wave linear retardance was obtained with less than 5% error in the case of a HWP comprising four LCs.
Figure 9B:
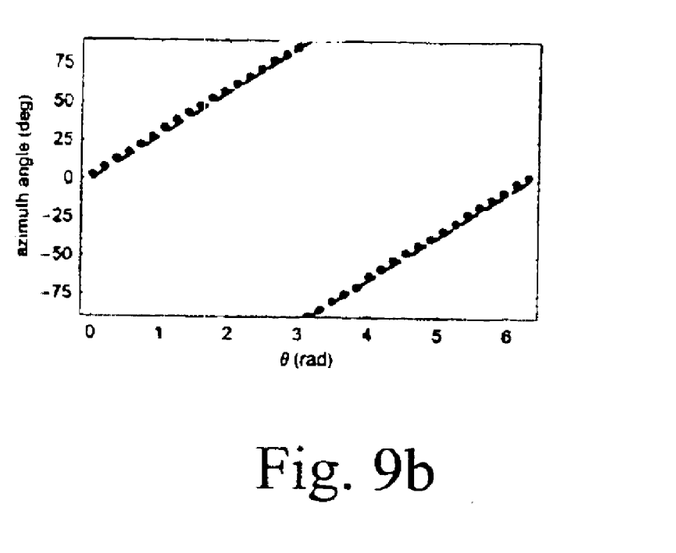
FIG. 9(b) shows the axis rotation through 180° in the case of a HWP comprising four LCs.

A second set of measurements refers to a sequence of 4 LCs with fast axes oriented at 45°, 0°, 45°, and 0° respectively. The implementation of the positive/negative retardance profiles described in section II-D was again obtained biasing (offsetting) each LC cell with a quartz HWP. FIG. 9(a) shows that the desired half wave linear retardance was obtained with less than 5% error. FIG. 9(b) shows the axis rotation through 180°.

Figure 10:
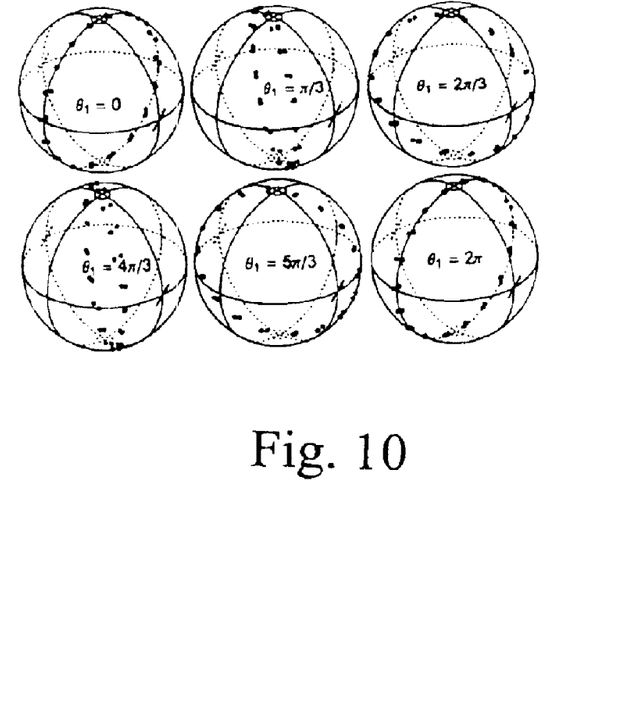
FIG. 10 shows measurements of continuous and endless polarization transformations by a sequence of 5 LCs.

The last set of measurements presented demonstrates endless polarization transformations from a fixed linear input SOP. This can be achieved by combining a HWP and a QWP. A suitable alignment of the first LCs axis, only 5 LCs are needed. The measurements are shown in FIG. 10 for 4 different values of $\theta_1$, the control parameter of the QWP, and $0 \leq \theta_2 \leq 2\pi$, with $\theta_2$ being the control parameter of the HWP. As $\theta_2$ varies the output SOP wraps around the Poincaré sphere twice. Homologous SOPs do not perfectly overlap because of small errors in the assembly. These measurements demonstrate continuous and endless coverage of the Poincaré sphere.

A new algorithm is provided for an endless reset-free automatic polarization controller made of variable retardance plates of finite operational range. The theory behind this algorithm was developed and experimentally verified. This algorithm can be used for building automatic polarization controllers based on transducers such as fiber squeezers, LCs, or electro-optic modulators without requiring complex resetting or unwinding algorithms.

Appendix

A quaternion is an algebraic object comprising a scalar part s, and a vector part $v=(v_x, v_y, v_z)$. Its norm, or length, is defined as $$|Q|=\sqrt{s^2+v_x^2+v_y^2+v_z^2}.$$

The norm of a unit quaternion equals 1. The inverse of a quaternion, denoted by $Q^{-1}$, is defined as $$Q^{-1}*Q=Q*Q^{-1}=1$$

Using the quaternion multiplication defined in (4), it can be verified that $$Q^{-1} = \{s, v\}^{-1} = \left\{\frac{s}{|Q|^2}, -\frac{v}{|Q|^2}\right\}$$

Figure 11:
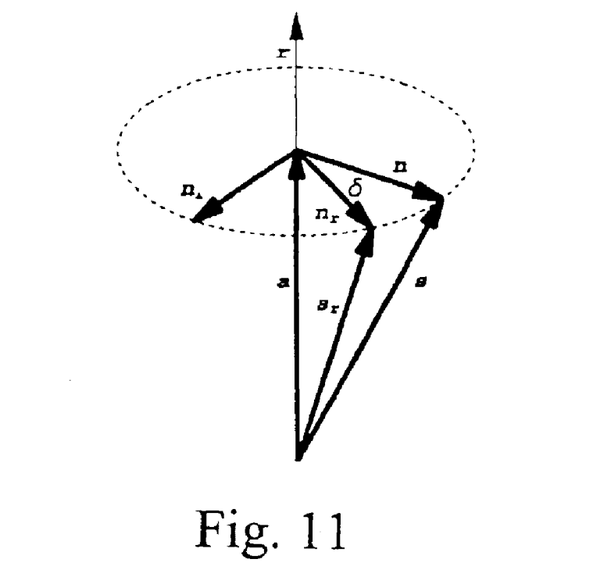
FIG. 11 shows a quaternion rotation operator geometry.

By considering the unit quaternion of (2), with reference to FIG. 11 and by virtue of the associativity of quaternion multiplication, it can be verified that $$\{0, \vec{s}_r\} = Q^{-1}*\{0, \vec{s}\}*Q$$
$$= Q^{-1}*\{0, \vec{a}\}*Q + Q^{-1}*\{0, \vec{n}\}*Q$$
$$= \{0, \vec{a}\} + \{0, \vec{n}_{perpendicular}\mathrm{Sin}(\delta) + \vec{n}\mathrm{Cos}(\delta)\}$$

i.e. $s_r$ is obtained by rotating s through an angle δ about the axis r.

What is claimed is:

1. A polarization controlling system for controlling the state of polarization of a light beam comprising:
   a) a waveplate having:
      a substantially constant retardance 2λ;
      a variable rotation axis $\hat{w}=\hat{x}\ \mathrm{Cos}(\theta)\mathrm{Cos}(\phi)+\hat{y}\ \mathrm{Sin}(\theta)\mathrm{Cos}(\phi)+\hat{z}\ \mathrm{Sin}(\phi)$; and N variable retarders, N≧2, the retarders for being disposed sequentially along a propagation direction to receive the light beam, each variable retarder having a fast axis disposed at substantially 45° from the fast axis of each nearest variable retarder, each variable retarder having a variable retardance $r_x$, x having an odd or even value between 1 and N, each retarder having an odd value x having a rotation quaternion $X(r_x)=\{\mathrm{Cos}(r_x/2), \mathrm{Sin}(r_x/2)\hat{x}\}$, each retarder having an even value x having a component rotation quaternion $Y(r_x)=\{\mathrm{Cos}(r_x/2), \mathrm{Sin}(r_x/2)\hat{y}\}$;
   wherein a total rotation quaternion $Q(X(r_1)Y(r_2)X(r_3) \ldots )= \ldots X(r_3)*Y(r_2)*X(r_1)$; and b) controlling means for controlling the retardances $r_x$ in dependence upon at least one solution to $Q(X(r_1)Y(r_2)X(r_3)\ldots)\infty \ldots X(r_3)*Y(r_2)*X(r_1) =\{\mathrm{Cos}(\lambda), \mathrm{Sin}(\lambda)\hat{w}\}$.

2. A polarization controlling system for controlling the state of polarization of a light beam as defined in claim 1 wherein the controlling means includes voltage generating means for generating voltages in dependence upon the at least one solution of $Q(X(r_1)Y(r_2)X(r_3) \ldots )= \ldots X(r_3)*Y(r_2)*X(r_1) =\{\mathrm{Cos}(\lambda), \mathrm{Sin}(\lambda)\hat{w}\}$.

3. A polarization controlling system for controlling the state of polarization of a light beam as defined in claim 2 wherein the voltages are for applying to the variable retarders.

4. A polarization controlling system for controlling the state of polarization of a light beam as defined in claim 1 wherein:
   a) N=2; and
   b) the at least one solution includes $$r_1 = 2\,\text{sign}(\text{Sin}(\theta))\arccos[\text{Cos}(\lambda)\sqrt{1+(\tan(\lambda)\text{Cos}(\theta)\text{Cos}(\phi))^2}];$$

$$r_2 = 2\arctan(\tan(\lambda)\text{Cos}(\theta)\text{Cos}(\phi));\text{ and}$$

$$\phi = -\arcsin\left[\frac{-1+\sqrt{1+[\tan(\lambda)\text{Sin}(2\theta)]^2}}{\tan(\lambda)\text{Sin}(2\theta)}\right];$$

wherein
sign(x)=−1 when x<0;
sign(x)=0 when x=0; and
sign(x)=1 when x>0.

5. A polarization controlling system for controlling the state of polarization of a light beam as defined in claim 2 wherein:
   a) N=2; and
   b) the at least one solution includes $$r_1 = 2\text{sign}(\text{Sin}(\theta))\arccos[\text{Cos}(\lambda)\sqrt{1+(\tan(\lambda)\text{Cos}(\theta)\text{Cos}(\phi))^2}];$$

$$r_2 = 2\arctan(\tan(\lambda)\text{Cos}(\theta)\text{Cos}(\phi));\text{ and}$$

$$\phi = -\arcsin\left[\frac{-1+\sqrt{1+[\tan(\lambda)\text{Sin}(2\theta)]^2}}{\tan(\lambda)\text{Sin}(2\theta)}\right];$$

wherein
sign(x)=−1 when x<0;
siqn(x)=0 when x=0; and
sign(x)=1 when x>0.

6. A polarization controlling system for controlling the state of polarization of a light beam as defined in claim 3 wherein:
   a) N=2; and
   b) the at least one solution includes $$r_1 = 2\text{sign}(\text{Sin}(\theta))\arccos[\cos(\lambda)\sqrt{1+(\tan(\lambda)\text{Cos}(\theta)\text{Cos}(\phi))^2}];$$

$$r_2 = 2\arctan(\tan(\lambda)\text{Cos}(\theta)\text{Cos}(\phi));\text{ and}$$

$$\phi = -\arcsin\left[\frac{-1+\sqrt{1+[\tan(\lambda)\text{Sin}(2\theta)]^2}}{\tan(\lambda)\text{Sin}(2\theta)}\right];$$

wherein
sign(x)=−1 when x<0;
sign(x)=0 when x=0; and
sign(x)=1 when x>0.

7. A polarization controlling system as defined in claim 1 wherein the variable retarders include a liquid crystal cell.

8. A polarization controlling system as defined in claim 7 wherein the controlling means includes means for applying a voltage to the liquid crystal cell.

9. A polarization controlling system as defined in claim 1 wherein the variable retarders includes an electro-optical material.

10. A polarization controlling system as defined in claim 9 wherein the controlling means includes means for applying a voltage to the electro-optical material.

11. A polarization controlling system as defined in claim 1, including at least one fixed retardance retarder for modifying the state of polarization of the light beam, to compensate for an offset retardance in the variable retarders.

12. A polarization controlling system for controlling the state of polarization of a light beam comprising:
   a waveplate having:
      a substantially constant retardance $2\mu$;
      a variable rotation axis $\hat{w}' = \hat{x}\,\text{Cos}(\theta) + \hat{y}\,\text{Sin}(\theta)$;
   a first variable retarder having a first fast axis and a variable retardance u;
   a second variable retarder having a second fast axis oriented at an angle of substantially 45° from the first fast axis and a variable retardance v;
   a third variable retarder having a third fast axis oriented at an angle of substantially 0° from the first fast axis and a variable retardance w; and
   controlling means for controlling the retardances u, v and w whereby $$u = w = \arctan(\text{Cos}(\theta)\tan(\mu)),\text{ and}$$

$$v = 2\text{sign}(\text{Sin}(\theta))\arccos\left\{\frac{\text{Cos}(\mu)}{\text{Cos}[\arctan(\text{Cos}(\theta)\tan(\mu))]}\right\}$$

wherein
sign(x)=−1 when x <0;
sign(x)=0 when x=0;
sign(x)=1 when x>0; and
$0 < 2\mu < \pi$;
wherein the first, second and third variable retarders are disposed for modifying the state of polarization of the light beam for controlling the state of polarization of the light beam.

13. A polarization controlling system for controlling the state of polarization of a light beam comprising:
   a half waveplate having:
      a retardance of substantially 180°;
      a variable rotation axis $$\hat{w} = \hat{x}\,\text{Cos}(\theta) = \hat{y}\,Sin(\theta);$$

a first variable retarder having a first fast axis and a variable retardance $u_1$;
   a second variable retarder having a second fast axis oriented at an angle of substantially 45° from the first fast axis and a variable retardance $u_2$;
   a third variable retarder having a third fast axis oriented at an angle of substantially 0° from the first fast axis and a variable retardance $u_3$; and
   a fourth variable retarder having a fourth fast axis oriented at an angle of substantially 45° from the first fast axis and a variable retardance $u_4$; and
controlling means for controlling the retardances $u_1$, $u_2$, $u_3$ and $u_4$ whereby $$u_1 = 2\text{sign}(\text{Sin}(\theta))\arccos[\text{Cos}(\lambda)\sqrt{1+(\tan(\lambda)\text{Cos}(\theta)\text{Cos}(\phi))_2}];$$

$$u^2 = 2\arctan(\tan(\lambda)\text{Cos}(\theta)\text{Cos}(\phi)) + \arctan[\text{Cos}(\theta + \Delta\theta)\tan(\mu)];$$

$$u_3 = 2\text{sign}(\text{Sin}(\theta + \Delta\theta)) \times \arccos\left\{\frac{\text{Cos}(\mu)}{\text{Cos}[\arctan[\text{Cos}(\theta + \Delta\theta)\tan(\mu)]]}\right\};$$

$$u_4 = \arctan[\text{Cos}(\theta + \Delta\theta)\tan(\mu)];$$

wherein:

$$\phi = -\arcsin\left[\frac{-1+\sqrt{1+[\tan(\lambda)\mathrm{Sin}(2\theta)]^2}}{\tan(\lambda)\mathrm{Sin}(2\theta)}\right];$$

$\Delta\theta = -\arctan(\mathrm{Sin}(\phi)\tan(\lambda))$;

$$\mu = \arctan\left[\sqrt{\frac{1}{\mathrm{Sin}^2(\lambda)\mathrm{Cos}^2(\phi)}-1}\right]; \text{ and}$$

$0 < \lambda < \pi/2$;

wherein the first, second, third and fourth variable retarders are disposed for modifying the state of polarization of the light beam for controlling the state of polarization of the light beam.

14. A polarization controlling system as defined in claim 12 wherein $\mu$ is substantially equal to $\pi/4$ radians.

15. A polarization controller for controlling the state of polarization of a light beam comprising first and second polarization controlling systems as defined in claim 14.

16. A polarization controller as defined in claim 15, additionally comprising a polarization controlling system for controlling the state of polarization of a light beam comprising:

a half waveplate having:
a retardance of substantially 180°;
a variable rotation axis $\hat{w} = \hat{x}\,\mathrm{Cos}(\theta) + \hat{y}\,\mathrm{Sin}(\theta)$;

a first variable retarder having a first fast axis and a variable retardance $u_1$;
a second variable retarder having a second fast axis oriented at an angle of substantially 45° from the first fast axis and a variable retardance $u_2$;
a third variable retarder having a third fast axis oriented at an angle of substantially 0° from the first fast axis and a variable retardance $u_3$; and
a fourth variable retarder having a fourth fast axis oriented at an angle of substantially 45° from the first fast axis and a variable retardance $u_4$; and
controlling means for controlling the retardances $u_1$, $u_2$, $u_3$ and $u_4$ whereby $u_1 = 2\,\mathrm{sign}(\mathrm{Sin}(\theta))\arccos[\mathrm{Cos}(\lambda)\sqrt{1+(\tan(\lambda)\mathrm{Cos}(\theta)\mathrm{Cos}(\phi))_2}]$;

$u_2 = 2\arctan(\tan(\lambda)\mathrm{Cos}(\theta)\mathrm{Cos}(\phi)) + \arctan[\mathrm{Cos}(\theta+\Delta\theta)\tan(\lambda)]$;

$$u_3 = 2\,\mathrm{sign}(\mathrm{Sin}(\theta+\Delta\theta)) \times \arccos\left\{\frac{\mathrm{Cos}(\mu)}{\mathrm{Cos}[\arctan[\mathrm{Cos}(\theta+\Delta\theta)\tan(\mu)]]}\right\};$$

$u_4\arctan[\mathrm{Cos}(\theta+\Delta\theta)\tan(\mu)]$;

wherein:

$$\phi = -\arcsin\left[\frac{-1+\sqrt{1+[\tan(\lambda)\mathrm{Sin}(2\theta)]^2}}{\tan(\lambda)\mathrm{Sin}(2\theta)}\right];$$

$\Delta\theta = -\arctan(\mathrm{Sin}(\phi)\tan(\lambda))$;

$$\mu = \arctan\left[\sqrt{\frac{1}{\mathrm{Sin}^2(\lambda)\mathrm{Cos}^2(\phi)}-1}\right]; \text{ and}$$

$0 < \lambda < \pi/2$;

wherein the first, second, third and fourth variable retarders are disposed for modifying the state of polarization of the light beam for controlling the state of polarization of the light beam.

* * * * *

UNITED STATES PATENT AND TRADEMARK OFFICE
CERTIFICATE OF CORRECTION

PATENT NO. : 6,947,618 B2
DATED : September 20, 2005
INVENTOR(S) : Martinelli et al.

It is certified that error appears in the above-identified patent and that said Letters Patent is hereby corrected as shown below:

Column 3,
Line 45, after "w whereby" insert -- $u = w = \arctan(Cos(\theta)\tan(\mu))$, and --.

Column 5,
Line 37, "and 45°, can" should read -- 0° and 45°, can --.

Column 12,
Line 57, "$X(r_3)...) \infty...X(r_3)*Y(r_2)*X(r_1)$" should read
-- $X(r_3)...) =...X(r_3)*Y(r_2)*X(r_1)$ --.

Column 16,
Line 17, "$u_4 \arctan[Cos(\theta + \Delta\theta)\tan(\mu)]$;" should read
-- $u_4 = \arctan[Cos(\theta + \Delta\theta)\tan(\mu)]$; --.

Signed and Sealed this

Seventh Day of February, 2006

JON W. DUDAS
*Director of the United States Patent and Trademark Office*